United States Patent
Wang et al.

(10) Patent No.: US 10,979,813 B2
(45) Date of Patent: Apr. 13, 2021

(54) TERMINAL AND METHOD CONTROLLING FOR STEREO SOUND EFFECT THEREOF

(71) Applicant: AAC Technologies Pte. Ltd., Singapore (SG)

(72) Inventors: Xiuyue Wang, Shenzhen (CN); Yulei Zhang, Shenzhen (CN); Jianqi Li, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/528,641

(22) Filed: Aug. 1, 2019

(65) Prior Publication Data

US 2020/0053465 A1 Feb. 13, 2020

(30) Foreign Application Priority Data

Aug. 9, 2018 (CN) .......................... 201810901285.4

(51) Int. Cl.
*H04R 5/04* (2006.01)
*H04R 5/02* (2006.01)
*G06F 1/16* (2006.01)

(52) U.S. Cl.
CPC .............. *H04R 5/04* (2013.01); *G06F 1/1688* (2013.01); *G06F 1/1694* (2013.01); *H04R 5/02* (2013.01)

(58) Field of Classification Search
CPC ........... H04R 5/04; H04R 5/02; G06F 1/1688; G06F 1/1694; G06F 1/1626
USPC .......................... 381/300, 61, 304, 303, 334
See application file for complete search history.

(56) References Cited

U.S. PATENT DOCUMENTS

| | | | |
|---|---|---|---|
| 2006/0161278 A1* | 7/2006 | Maeda | H04M 1/03 700/94 |
| 2016/0274722 A1* | 9/2016 | Putzolu | G06F 3/03547 |
| 2016/0349799 A1* | 12/2016 | Jiang | G06F 3/01 |

* cited by examiner

*Primary Examiner* — Vivian C Chin
*Assistant Examiner* — Con P Tran
(74) *Attorney, Agent, or Firm* — W&G Law Group LLP

(57) ABSTRACT

A terminal and a method for controlling a stereo sound effect thereof are provided. The terminal includes at least two speakers, and the method includes: presetting a relationship between an angle and a sound effect, the relationship represents a sound effect of each speaker at each corresponding angle value; acquiring, in real time, an angle value of an orientation of a screen of the terminal; and after acquiring the angle value, acquiring the a sound effect of each speaker at the angle value according to the relationship of each speaker, and controlling each speaker to play according to the corresponding sound effect. Mo matter how the terminal rotates, the sound effect played at the same angle value is kept unchanged, so that the terminal can show the consistent stereo sound effect at different angle values.

8 Claims, 3 Drawing Sheets

TERMINAL AND METHOD CONTROLLING FOR STEREO SOUND EFFECT THEREOF

TECHNICAL FIELD

The present disclosure relates to the technical field of electronics and, in particular, to a terminal and a method for controlling stereo sound effect for a terminal.

BACKGROUND

Generally, two speakers are mounted in a terminal, such as a cellphone, a tablet PC and the like, pursuing a stereo sound effect, one speaker is mounted at the top end of the terminal, the other speaker is mounted at the bottom end of the terminal, and no matter how the terminal rotates, the speakers play the same sound effect at different angle values (the angle value is an angle value of an orientation of screen of the terminal; and the orientation of screen is determined with reference to the top end of the screen). For example, when the angle value of the orientation of screen is within a range of [0, 180], the speaker located at the top end plays an A-type sound effect and the speaker located at the bottom end plays a B-type sound effect; and when the terminal rotates and the angle value of the orientation of screen is within a range of (180, 360), the speaker located at the top end plays the A-type sound effect and the speaker located at the bottom end plays the B-type sound effect.

However, the inventor finds that in the prior art, there are at least problems as follows: the speakers play the same sound effect at different angle values (or angle ranges), i.e., the sound effect played at the same angle value (or the angle range) will be changed along with rotation of the terminal, and thus, as rotation of the terminal, the terminal cannot show a consistent stereo sound effect at different angle values (or angle ranges). Changes of sound effect hearing may cause a case that a user makes inaccurate judgment according to sound heard (for example, when sound of a train is transmitted to the right end from the left end, it may cause a case that the sound heard by the user is transmitted to the left end from the right end).

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated with reference to the accompanying drawings and the embodiments.

Figure 1:
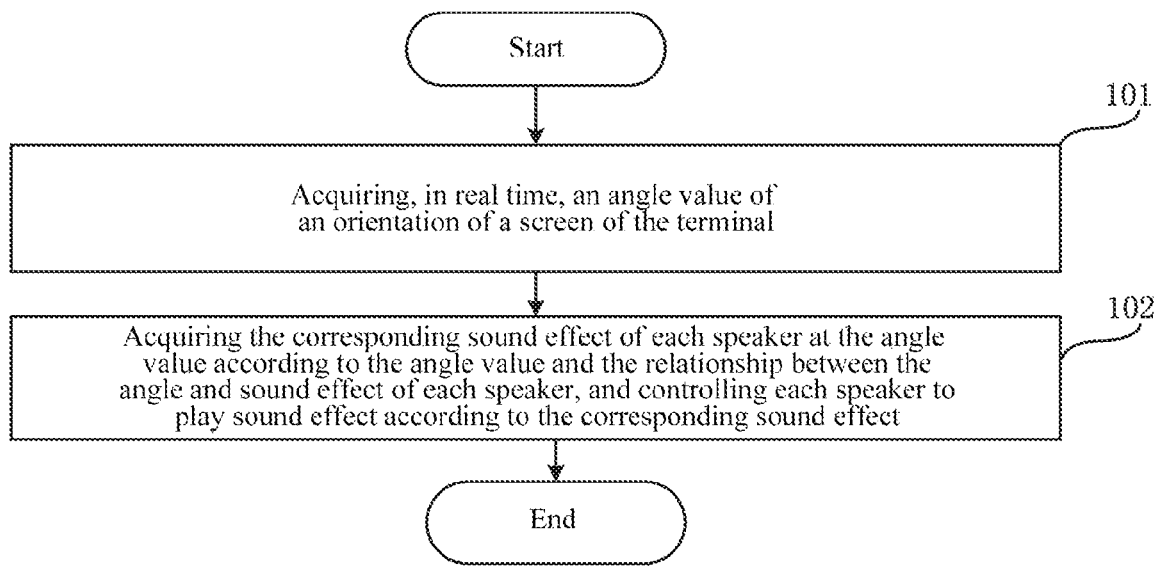
FIG. 1 is a flow schematic diagram of a method for controlling a stereo sound effect for a terminal according to a first embodiment.

A first embodiment of the present disclosure relates to a method for controlling a stereo sound effect for a terminal. The terminal, for example, is a cellphone, a tablet PC and the like; and as shown in FIG. 1, the method for controlling the stereo sound effect for a terminal includes:

S101: acquiring, in real time, an angle value of an orientation of a screen of the terminal.

In this embodiment, the terminal includes at least two speakers, and the at least two speakers are located at opposite positions of the terminal; and for example, there are two speakers, one speaker is mounted at the top of the terminal, the other speaker is mounted at the bottom of the terminal. However, it is just exemplary illustration herein, the present disclosure is not limited thereto in practice, and for example, one speaker is respectively mounted at the central position of each of four edges of the terminal.

In this embodiment, a relationship between the angle and the sound effect of each speaker is preset, the relationship shows a corresponding sound effect of the speaker at each angle value, the angle value is an angle value of the orientation of the screen of the terminal, and the orientation of the screen is determined with reference to the top end of the screen. In one example, if the top end of the screen points to 45 degrees, the angle value of the orientation of screen is 45 degrees.

In one example, the terminal includes a first speaker located at the top end of the terminal and a second speaker located at the bottom end of the terminal; the corresponding sound effect of each speaker at each angle value is: at a first angle value, the corresponding sound effect of the first speaker is an A-type sound effect, and the corresponding sound effect of the second speaker is a B-type sound effect; and at a second angle value opposite to the first angle value, the corresponding sound effect of the first speaker is the B-type sound effect, and the corresponding sound effect of the second speaker is the A-type sound effect. However, it is just exemplary illustration herein, and the present disclosure is not limited thereto in practice.

In one specific example, the A-type sound effect and the B-type sound effect can be opposite types of sound effects, for example, the A-type sound effect is a sound effect of a train from far to near, the B-type sound effect can be a sound effect of a train from near to far. However it is just exemplary illustration herein, and the present disclosure does not make any limit to the type of the sound effect at each angle value.

S102: acquiring the corresponding sound effect of each speaker at the angle value according to the angle value and the relationship between the angle and sound effect of each speaker, and controlling each speaker to play sound effect according to the corresponding sound effect.

The embodiments of the present disclosure, compared to the prior art, provide the method for controlling the stereo sound effect of the terminal, including: firstly, presetting the corresponding sound effect of each speaker at the angle value of each orientation of the screen, acquiring the angle value of the orientation of the screen of the terminal in real time, acquiring the corresponding sound effect of each speaker at the angle value according to the angle value and the relationship between the angle and the sound effect of each speaker, and controlling each speaker to play sound effect according to the corresponding sound effect, i.e., dynamically controlling the sound effect played by each speaker according to a rotation angle of the terminal, so that no matter how the terminal rotates, the speaker at the same angle value can play the same sound effect, i.e., the sound effect played at the same angle value is kept unchanged, thereby enabling the terminal to show the consistent stereo sound effect at different angle values and avoiding a case that a user makes inaccurate judgment according to stereo sound played by the terminal to the greatest extent.

Step partitioning in various methods above are merely for clear description, and in the implementation process, the steps can be merged into one step or some steps can be divided into a plurality of steps, as long as the same logic relationship is included, all of which shall fall within the protection scope of the present disclosure; and all the added insignificant modifications or introduced insignificant designs in an algorithm or flow without changing the core design of the algorithm and the flow of the present disclosure shall fall within the protection scope of the present disclosure.

A second embodiment of the present disclosure relates to a method for controlling a stereo sound effect for a terminal. The second embodiment is an improvement on the basis of the first embodiment, and the main improvement is that: in the second embodiment of the present disclosure, an acquiring mode of the angle value of the orientation of a screen is provided.

Figure 2:
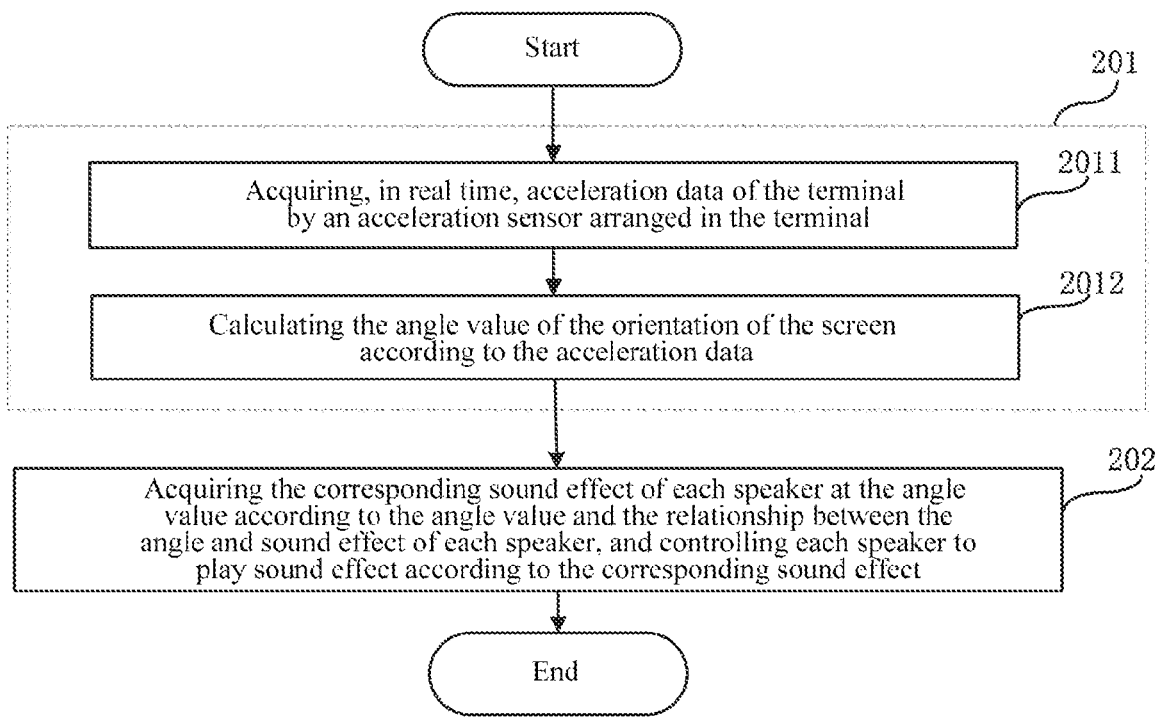
FIG. 2 is a flow schematic diagram of a method for controlling a stereo sound effect for a terminal according to a second embodiment.

The method for controlling the stereo sound effect according to this embodiment is as shown in FIG. 2, the step S202 in this embodiment is correspondingly the same as the step S102 in the first embodiment and is not repeated herein, and the step S201 in this embodiment includes sub-steps as follows:

S2011: acquiring, in real time, acceleration data of the terminal by an acceleration sensor arranged in the terminal.

S2012: calculating the angle value of the orientation of the screen according to the acceleration data.

In this embodiment, the terminal is a cellphone for example, a central point of the screen is used as an origin, an X axis is in parallel to a short edge of the cellphone, a Y axis is in parallel to a long edge of the cellphone, the acceleration sensor acquires acceleration data of the cellphone in both the X-axis direction and the Y-axis direction, and the angle value of the orientation of the screen is obtained by calculating inverse trigonometric functions of the acceleration data in the X-axis and the Y-axis.

According to this embodiment, compared to the first embodiment, the acceleration data of the terminal is acquired in real time by the built-in acceleration sensor, and the angle value of the orientation of the screen is calculated according to the acceleration data, i.e., the embodiment of the present disclosure provides a specific acquiring mode of the angle value of the orientation of the screen, and the angle value is calculated by utilizing the existing acceleration sensor in the terminal.

A third embodiment of the present disclosure relates to a method for controlling a stereo sound effect for a terminal. The third embodiment is an improvement on the basis of the second embodiment, and the main improvement is that: in the third embodiment of the present disclosure, an acquiring mode of the corresponding sound effect of each speaker at the angle value is provided.

Figure 3:
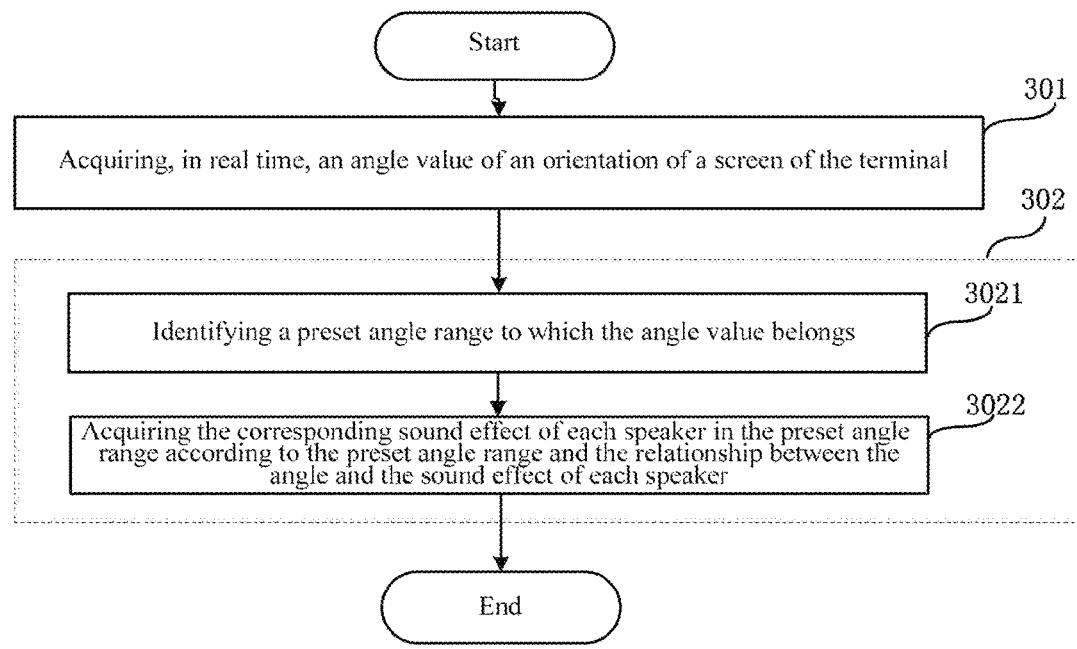
FIG. 3 is a flow schematic diagram of a method for controlling a stereo sound effect for a terminal according to a third embodiment.

The method for controlling the stereo sound effect according to this embodiment is as shown in FIG. 3, the step S301 in this embodiment is correspondingly the same as the step S201 in the second embodiment and is not repeated herein, and the step S302 in this embodiment includes sub-steps as follows:

S3021: identifying a preset angle range to which the angle value belongs.

In this embodiment, the relationship between the angle and the sound effect specifically shows a corresponding sound effect of the speaker in each preset angle range. In this embodiment, a range of 0 to 360 degrees can be partitioned into a plurality of angle ranges in advance and the plurality of angle ranges can be pre-stored.

In one example, the preset angle ranges are respectively: 45 degrees to 135 degrees, 135 degrees to 225 degrees, 225 degrees to 315 degrees and 315 degrees to 45 degrees, but not limited thereto in practice, and this embodiment does not make any limit to a partitioning mode of the preset angle range.

In one example, if the angle value is 60 degrees, it can be identified that the angle value is within the preset angle range of 45 degrees to 135 degrees, but it is just exemplary illustration herein and the present disclosure is not limited thereto in practice.

In one example, the preset angle ranges of 45 degrees to 135 degrees, 135 degrees to 225 degrees, 225 degrees to 315 degrees, and 315 degrees to 45 degrees respectively correspond to an A-type sound effect, a B-type sound effect, a C-type sound effect and a D-type sound effect. However, it is just exemplary illustration herein, and the present disclosure is not limited thereto in practice.

In another example, the present angle ranges are respectively: greater than or equal to zero degree and smaller than or equal to 180 degrees, and greater than 180 degrees and smaller than 360 degrees. However, it is just exemplary illustration herein, and the present disclosure is not limited thereto in practice.

In one example, a corresponding sound effect of the speaker located at the top of the terminal in the preset angle range greater than or equal to zero degree and smaller than or equal to 180 degrees is a first sound effect, and a corresponding sound effect of the speaker in the preset angle range greater than 180 degrees and smaller than 360 degrees is a second sound effect. A corresponding sound effect of the speaker located at the bottom end of the terminal in the preset angle range greater than or equal to zero degree and smaller than or equal to 180 degrees is the second sound effect, and a corresponding sound effect of the speaker in the preset angle range greater than 180 degrees and smaller than 360 degrees is the first sound effect. The first sound effect and the second sound effect are opposite sound effects, wherein the first sound effect, for example, is a sound effect of wind sound from far to near, the second sound effect is a sound effect of wind sound from near to far, i.e., the first sound effect and the second sound effect are opposite sound effects. For a further example, the first sound effect is a sound effect with the sound getting louder and louder along with time, and the second sound effect is a sound effect with the sound getting lower and lower along with time, i.e., the first sound effect and the second sound effect are opposite sound effects.

S3022: acquiring the corresponding sound effect of each speaker in the preset angle range according to the preset angle range and the relationship between the angle and the sound effect of each speaker.

In one example, the preset angle range is 45 degrees to 135 degrees, and the acquired corresponding sound effect of the speaker in the preset angle range of 45 degrees to 135 degrees is the A-type sound effect. However, it is just exemplary illustration herein, and the present disclosure is not limited thereto in practice.

In practice, this embodiment also can be a solution on the basis of the first embodiment.

This embodiment of the present disclosure, compared to the second embodiment, provides a specific implementation mode of acquiring the corresponding sound effect of each speaker in the preset angle range, i.e., the preset angle range of the angle value is identified and the corresponding sound effect of each speaker in the preset angle range is acquired according to the preset angle range and the relationship between the angle and the sound effect of each speaker.

A fourth embodiment of the present disclosure relates to a method for controlling a stereo sound effect for a terminal. The fourth embodiment is an improvement on the basis of the third embodiment, and the main improvement is that: in the fourth embodiment of the present disclosure, another acquiring mode of the angle value of the orientation of the screen is provided.

Figure 4:
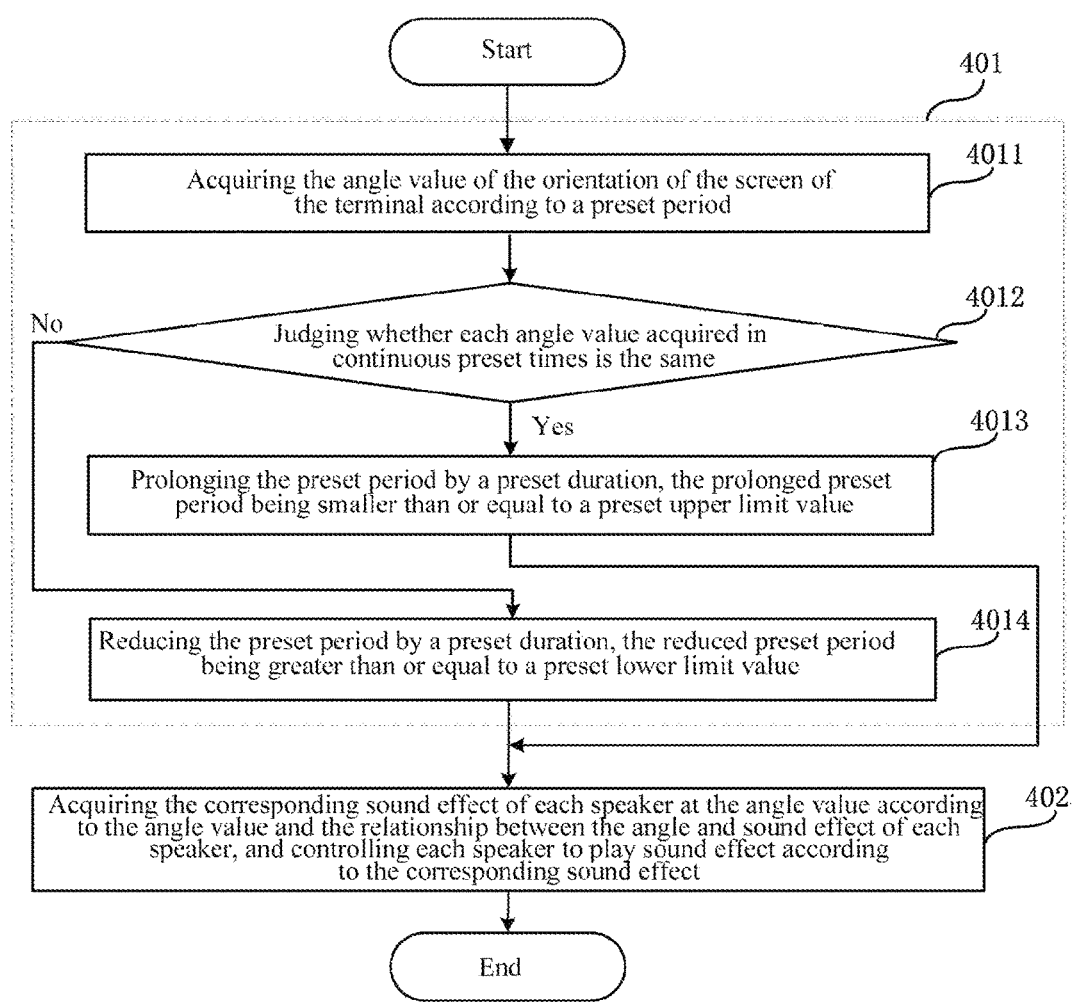
FIG. 4 is a flow schematic diagram of a method for controlling a stereo sound effect for a terminal according to a fourth embodiment.

The method for controlling the stereo sound effect according to this embodiment is as shown in FIG. 4, the step S402 in this embodiment is correspondingly the same as the step S302 in the second embodiment and is not repeated herein, and the step S401 in this embodiment includes sub-steps as follows:

S4011: acquiring the angle value of the orientation of the screen of the terminal according to a preset period.

In this embodiment, the preset period, for example, is 0.3 second, but is not limited thereto in practice, and the present disclosure does not make any limit to a specific value of the preset period.

S4012: judging whether each angle value acquired in continuous preset times is the same; and if yes, executing the sub-step S4013, otherwise executing the sub-step S4014.

In this embodiment, the preset times can be five times or six times (i.e., acquisition is continuously carried out for five or six preset periods), but it is not limited thereto in practice, and the present disclosure does not make any limit to a specific value of the preset times.

In one example, a first angle value acquired can be compared to each of other angle values one by one so as to judge whether each angle value is the same, but it is just exemplary illustration herein, and the present disclosure is not limited thereto in practice.

S4013: prolonging the preset period by a preset duration, the prolonged preset period being smaller than or equal to a preset upper limit value.

In this embodiment, the preset duration, for example, is 0.2 second, but not limited thereto in practice, and the present disclosure does not make any limit to a specific value of the preset duration.

In this embodiment, the preset upper limit value can be 5 seconds, but not limited thereto in practice, and the present disclosure does not make any limit to a specific value of the preset upper limit value.

In one example, the preset period is 0.3 second, the preset duration is 0.2 second, then the prolonged preset duration is 0.5 second, then the prolonged preset duration of 0.5 second is compared to the preset upper limit value of 5 seconds and is obviously smaller than the preset upper limit value (in this embodiment, when the prolonged preset period is greater than the preset upper limit value, the current preset period is not prolonged and the previous preset period is kept), but it is just exemplary illustration herein, and the present disclosure is not limited thereto in practice.

S4014: reducing the preset period by a preset duration, the reduced preset period being greater than or equal to a preset lower limit value.

In this embodiment, the preset lower limit value can be 0.3 second, but not limited thereto in practice, and the present disclosure does not make any limit to a specific value of the preset lower limit value.

In one example, the preset period is 4 seconds, the preset duration is 0.2 second, then the reduced preset duration is 3.8 seconds, then the reduced preset duration of 3.8 seconds is compared to the preset lower limit value of 0.3 second and is obviously greater than the preset lower limit value (in this embodiment, when the reduced preset period is smaller than the preset lower limit value, the current preset period is not reduced and the previous preset period is kept), but it is just exemplary illustration herein, and the present disclosure is not limited thereto in practice.

In practice, this embodiment also can be a solution on the basis of the first or second embodiment.

According to this embodiment, compared to the third embodiment, the angle value is acquired according to the preset period, it is judged whether each acquired angle value in the preset times is the same, if yes, the preset period is prolonged by the preset duration, and if no, the preset period is reduced by the preset duration, so that when the angle value of the orientation of the screen is unchanged in a period of continuous duration, thus processing energy consumption can be saved.

A fifth embodiment of the present disclosure relates to a method for controlling a stereo sound effect for a terminal. The fifth embodiment is an improvement on the basis of the fourth embodiment, and the main improvement is that: in the fifth embodiment of the present disclosure, when a playing command for an audio file is detected, the angle value of the orientation of the screen is acquired in real time.

Figure 5:
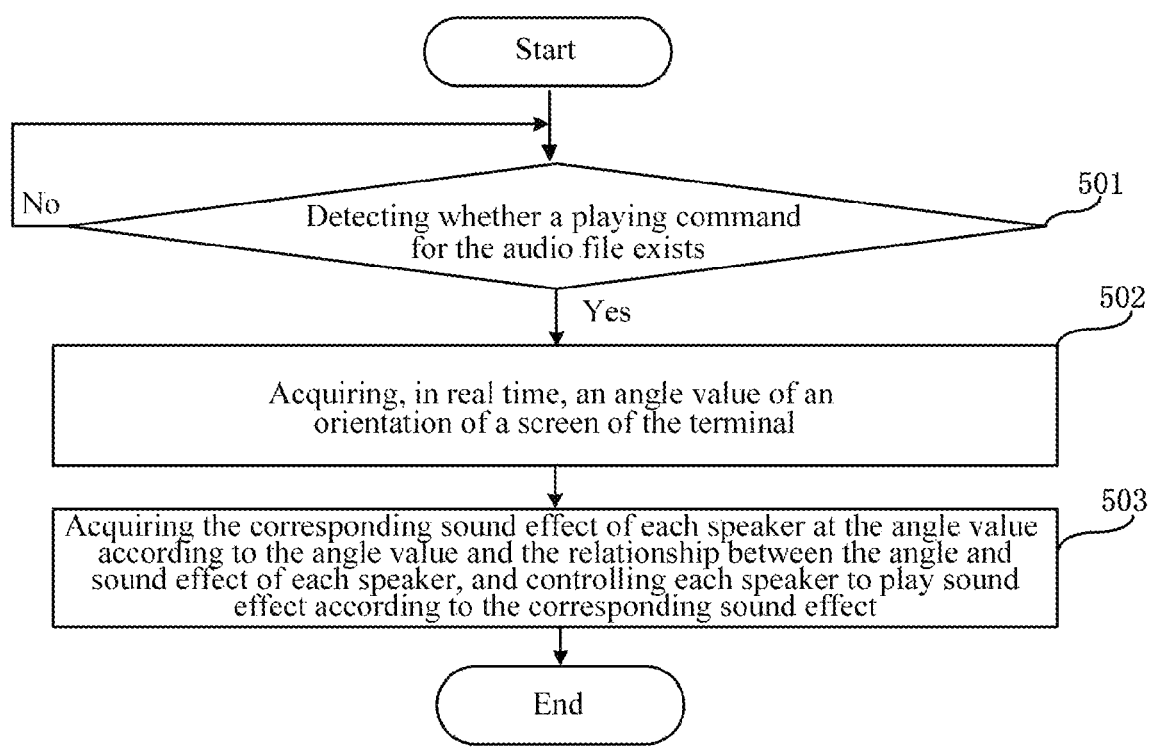
FIG. 5 is a flow schematic diagram of a method for controlling a stereo sound effect for a terminal according to a fifth embodiment.

The method for controlling the stereo sound effect according to this embodiment is as shown in FIG. 5, the steps S502 and S503 in this embodiment are correspondingly the same as the steps S401 and S402 in the fourth embodiment and are not repeated herein, and in this embodiment, the following steps are newly added:

S501: detecting whether a playing command for the audio file exists; and if yes, executing the step S502, otherwise repeating this step.

In practice, this embodiment also can be an improved solution on the basis of the first, second or third embodiment.

According to this embodiment of the present disclosure, compared to the fourth embodiment, when the playing command for the audio file is detected, the angle value of the orientation of the screen is acquired in real time, so that the energy consumption can be reduced.

A sixth embodiment of the present disclosure relates to a terminal, characterized by including: at least one processor; and a memory in communication with the at least one processor, and at least two speakers, wherein the memory stores an instruction which can be executed by the at least one processor, and the instruction is executed by the at least one processor, so that the at least one processor can execute the method for controlling the stereo sound effect for the terminal according to any one of the first to fifth embodiments.

The storage is connected with the processor in a bus mode, buses can include random numbers of interconnected buses and bridges, and the buses connect various circuits of one or more processors and the memory together. The buses can also connect various other circuits such as a peripheral device, a voltage stabilizer, a power management circuit and the like together, which are all well-known in the art and thus are not further described herein. A bus interface provides an interface between the bus and a transceiver. The transceiver can be a component, and can also be formed by a plurality of components such as a plurality of receivers and transmitters, and provides an element for communicating with various other apparatuses on a transmission medium. Data processed by the processor is transmitted on a wireless medium by an antenna, and further, the antenna also receives the data and transmits the data to the processor.

The processor takes charge of managing bus and carrying out general processing and can also provide various functions including timing, a peripheral interface, voltage regulation, power supply management and other control functions. The memory can be used for storing data used when the processor executes operations.

The embodiments, compared to the prior art, provide the method for controlling the stereo sound effect for the terminal, including: firstly, presetting the corresponding sound effect of each speaker at the angle value of each orientation of the screen, acquiring the angle value of the orientation of the screen of the terminal in real time, acquiring the corresponding sound effect of each speaker at the angle value according to the angle value and the relationship between the angle and the sound effect of each speaker, and controlling each speaker to play according to the corresponding sound effect, i.e., dynamically controlling the sound effect played by each speaker according to the rotation angle of the terminal, so that no matter how the terminal rotates, the speaker at the same angle value can play the same sound effect, i.e., the sound effect played at the same angle value is kept unchanged, thereby enabling the terminal to show the consistent stereo sound effect at different angle values and avoiding a case that a user makes inaccurate judgment according to stereo sound played by the terminal to the greatest extent.

A seventh embodiment of the present disclosure relates to a computer readable storage medium, storing a computer program. When the computer program is executed by a processor, the method for controlling the stereo sound effect for the terminal according to any one of the first embodiment to the fifth embodiment is achieved.

The embodiments, compared to the prior art, provides the method for controlling the stereo sound effect for the terminal, including: firstly, presetting the corresponding sound effect of each speaker at the angle value of each orientation of the screen, acquiring the angle value of the orientation of the screen of the terminal in real time, acquiring the corresponding sound effect of each speaker at the angle value according to the angle value and the relationship between the angle and the sound effect of each speaker, and controlling each speaker to play according to the corresponding sound effect, i.e., dynamically controlling the sound effect played by each speaker according to the rotation angle of the terminal, so that no matter how the terminal rotates, the speaker at the same angle value can play the same sound effect, i.e., the sound effect played at the same angle value is kept unchanged, thereby enabling the terminal to show the consistent stereo sound effect at different angle values and avoiding a case that a user makes inaccurate judgment according to stereo sound played by the terminal to the greatest extent.

Namely, those skilled in the art can understand that implementation of all or part of the steps in the method according to the above-mentioned embodiments can be completed by instructing relevant hardware through the program, and the program is stored in one storage medium and includes a plurality of instructions for enabling one device (which can be a single-chip microcomputer, a chip and the like) or the processor to execute all or part of the steps in the method according to each embodiment of the present disclosure. The above-mentioned storage medium includes any one of various media which can store programming codes, such as a U disk, a mobile hard disk, a Read-Only Memory (ROM), a Random Access Memory (RAM), a magnetic disk or an optical disk and the like.

Those skilled in the art should understand that the foregoing embodiments are specific embodiments for implementing the present disclosure, and in the practical application, various changes can be made thereto in form and detail without departure from the spirit and the scope of the present disclosure.

What is claimed is:

1. A method for controlling a stereo sound effect for a terminal, the terminal comprising at least two speakers, wherein the method comprises:
presetting a relationship between an angle and a sound effect for each of the at least two speakers, the relationship representing a sound effect of each of the at least two speakers at a corresponding angle value, the angle value being an angle value of an orientation of a screen of the terminal, and the orientation of the screen is determined based on a top end of a screen;
acquiring, in real time, the angle value of the orientation of the screen of the terminal;
after acquiring the angle value, acquiring the sound effect of each of the at least two speakers at the corresponding angle value according to the angle value and the relationship between the angle and the sound effect of each of the at least two speakers; and
controlling each of the at least two speakers to play according to the corresponding sound effect;
wherein the acquiring, in real time, the angle value of the orientation of the screen of the terminal comprises:
acquiring the angle value of the orientation of the screen of the terminal according to a preset period;
determining whether angle values continuously acquired in a preset number of times are identical;
if yes, prolonging the preset period by a preset duration, the prolonged preset period being smaller than or equal to a preset upper limit value; and
if no, reducing the preset period by a preset duration, the reduced preset period being greater than or equal to a preset lower limit value.

2. The method as described in claim 1, wherein the acquiring, in real time, the angle value of the orientation of the screen of the terminal comprises:
acquiring, by an acceleration sensor arranged in the terminal, in real time, acceleration data of the terminal; and
calculating the angle value of the orientation of the screen according to the acceleration data.

3. The method as described in claim 1, wherein the relationship between the angle and the sound effect represents a corresponding sound effect of each of the at least two speakers in each preset angle range; and the acquiring the sound effect of each of the at least two speakers at the corresponding angle value according to the angle value and the relationship between the angle and the sound effect of each of the at least two speakers comprises:
identifying a preset angle range to which the angle value belongs; and acquiring a sound effect of each of the at least two speakers in the preset angle range according to the preset angle range and the relationship between the angle and the sound effect of each of the at least two speakers.

4. The method as described in claim 3, wherein the preset angle range comprises: a preset angle range being greater than or equal to zero degree and smaller than or equal to 180 degrees, and a preset angle range being greater than 180 degrees and smaller than 360 degrees.

5. The method as described in claim 4, wherein the at least two speakers include two speakers; and one of the two speakers is mounted at a top end of the terminal and the other one of the two speakers is mounted at a bottom end of the terminal.

6. The method as described in claim 5, wherein a sound effect of the one of the at least two speakers located at the top end of the terminal in the preset angle range greater than or equal to zero degree and smaller than or equal to 180 degrees is a first sound effect, and a sound effect of the one of the at least two speakers located at the top end of the terminal in the preset angle range greater than 180 degrees and smaller than 360 degrees is a second sound effect;

a sound effect of the other one of the at least two speakers located at the bottom end of the terminal in the preset angle range greater than or equal to zero degree and smaller than or equal to 180 degrees is the second sound effect, and a sound effect of the other one of the at least two speakers located at the bottom end of the terminal in the preset angle range greater than 180 degrees and smaller than 360 degrees is the first sound effect; and the first sound effect and the second sound effect are opposite to each other.

7. The method as described in claim 1, further comprising, prior to the acquiring, in real time, the angle value of the orientation of the screen of the terminal:

detecting a playing command for an audio file.

8. A terminal, comprising:

at least one processor; and a memory and at least two speakers communicatively connected to the at least one processor, wherein the memory stores an instruction which can be executed by the at least one processor, and the instruction is executed by the at least one processor, to cause the at least one processor to perform the method as described in claim 1.

* * * * *